United States Patent Office 3,211,203
Patented Oct. 12, 1965

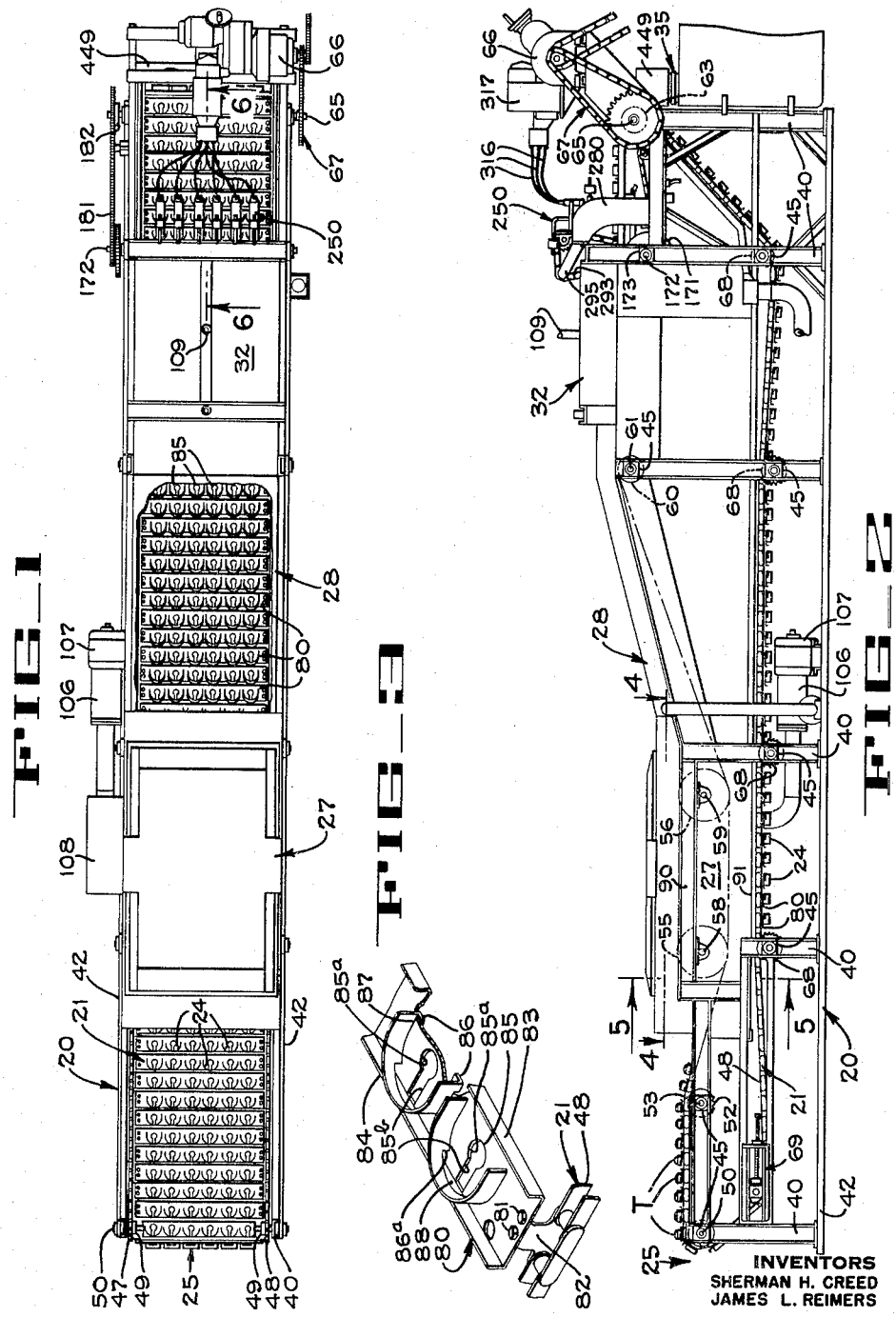

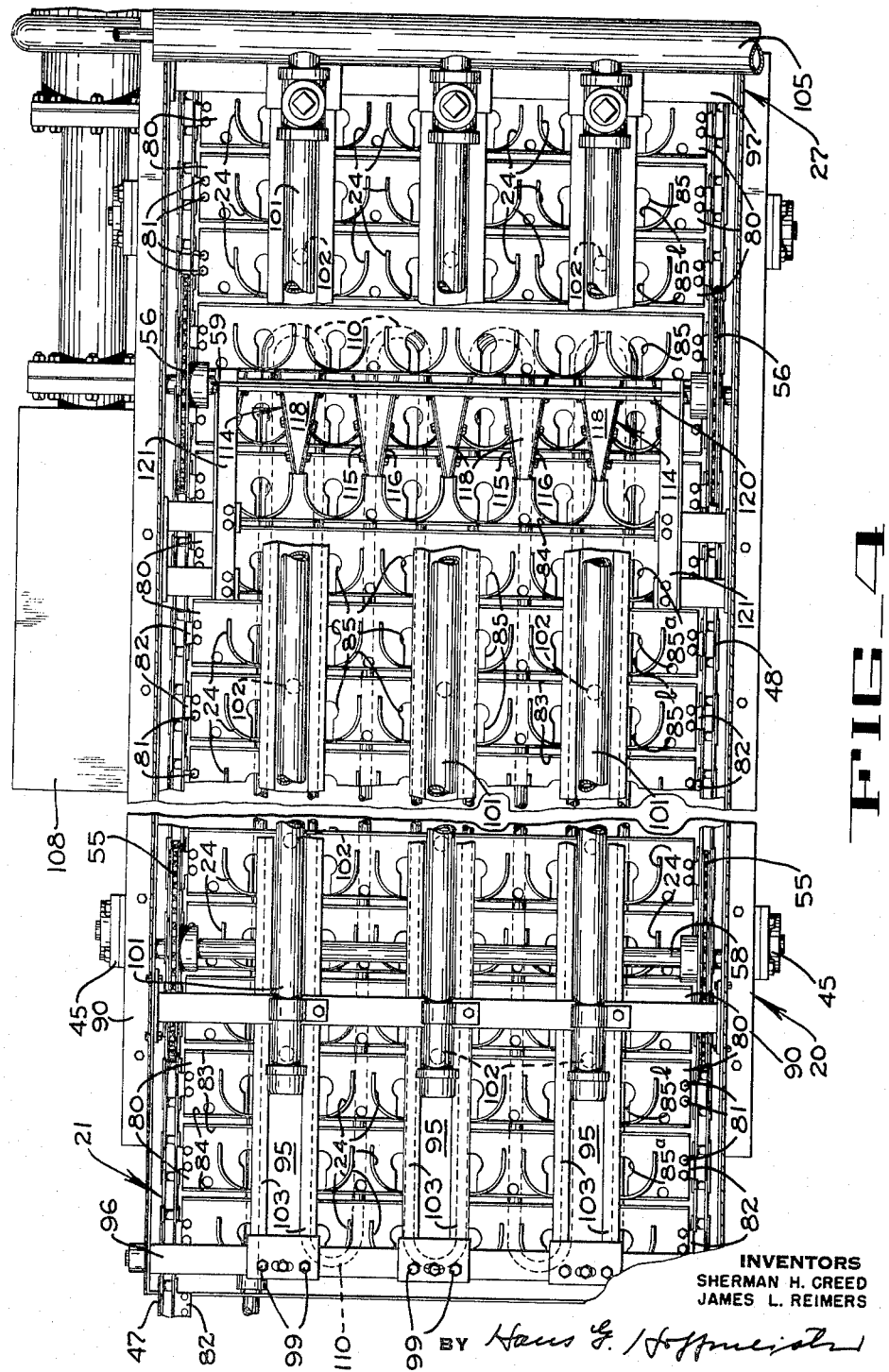

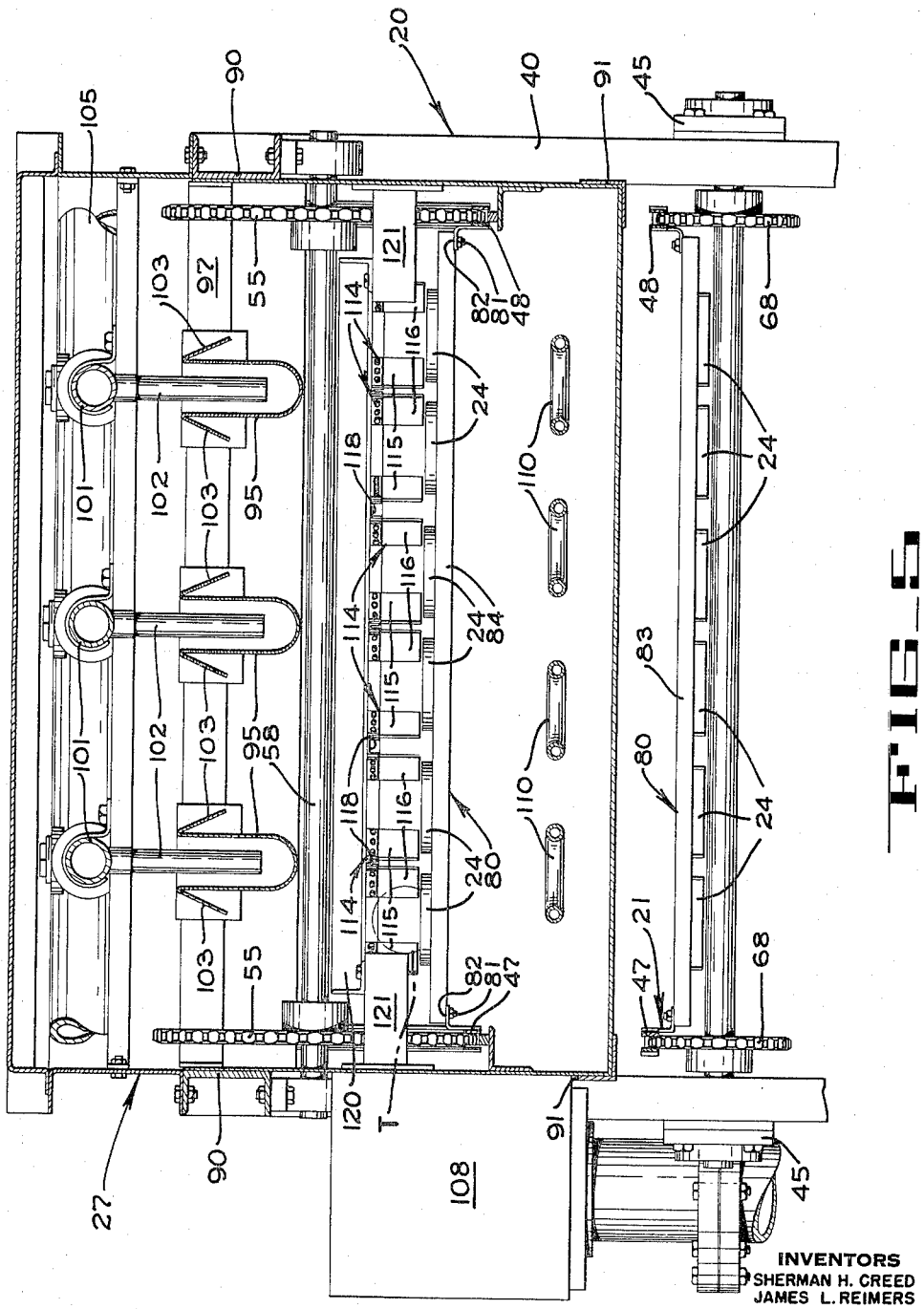

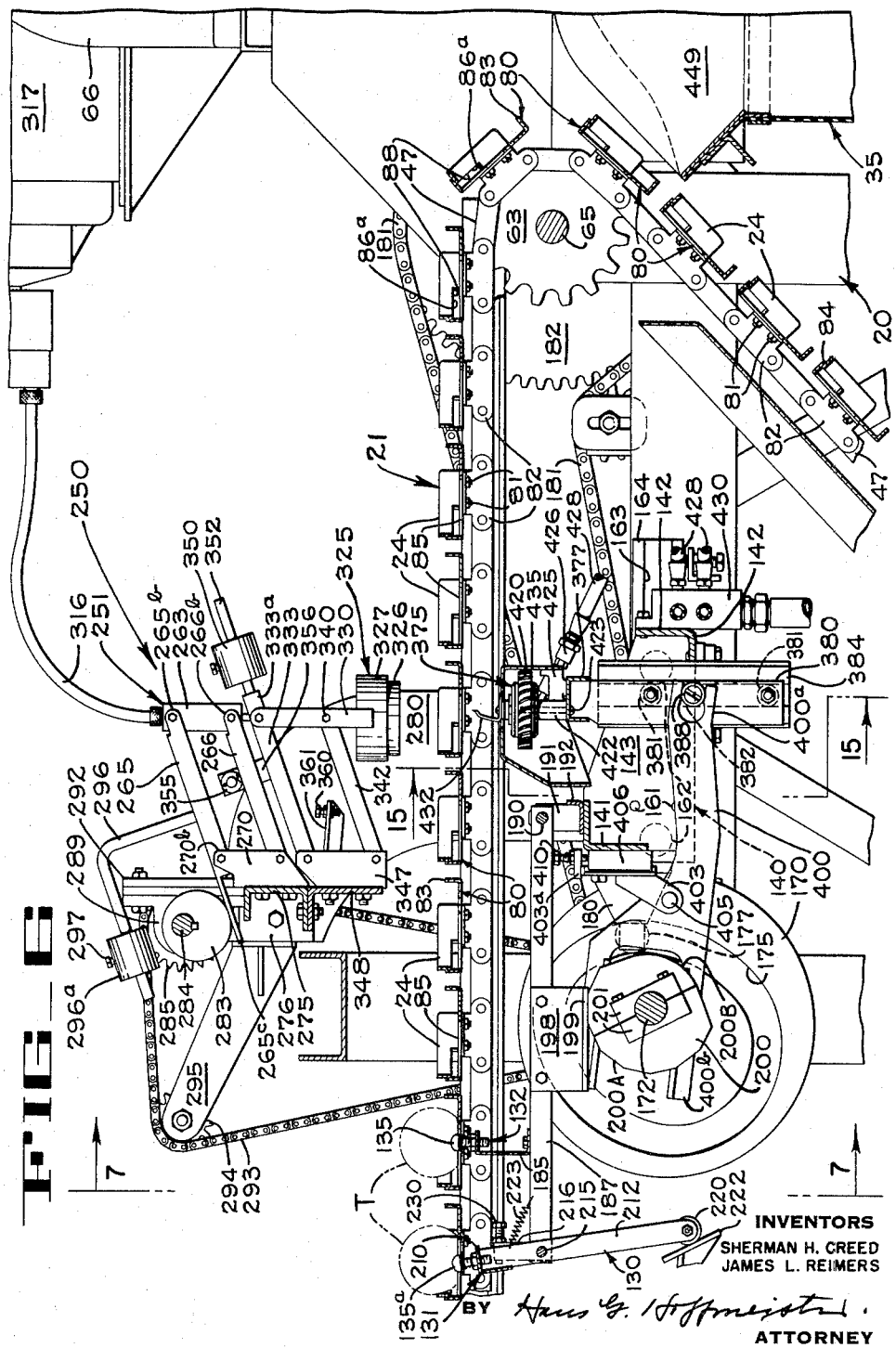

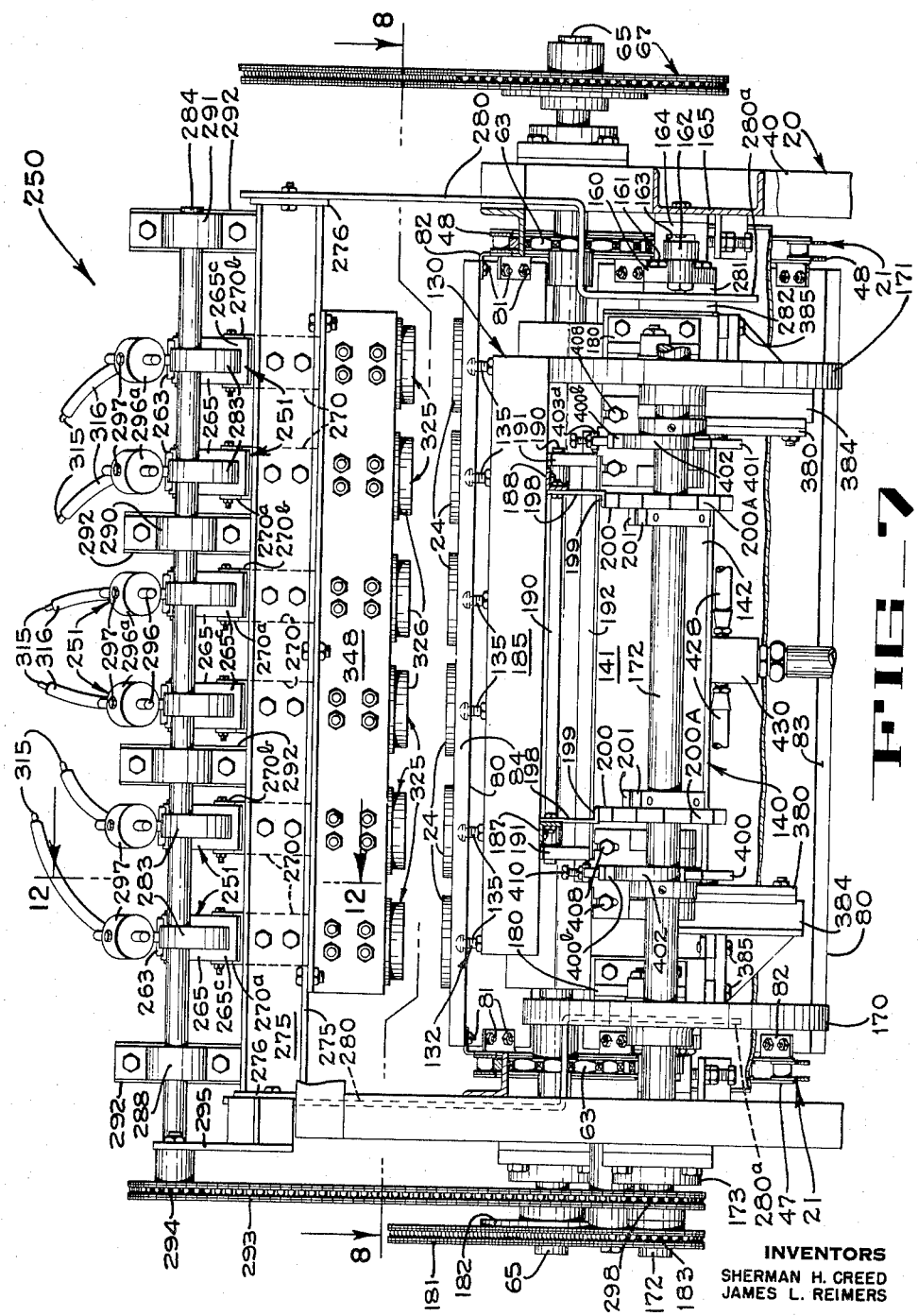

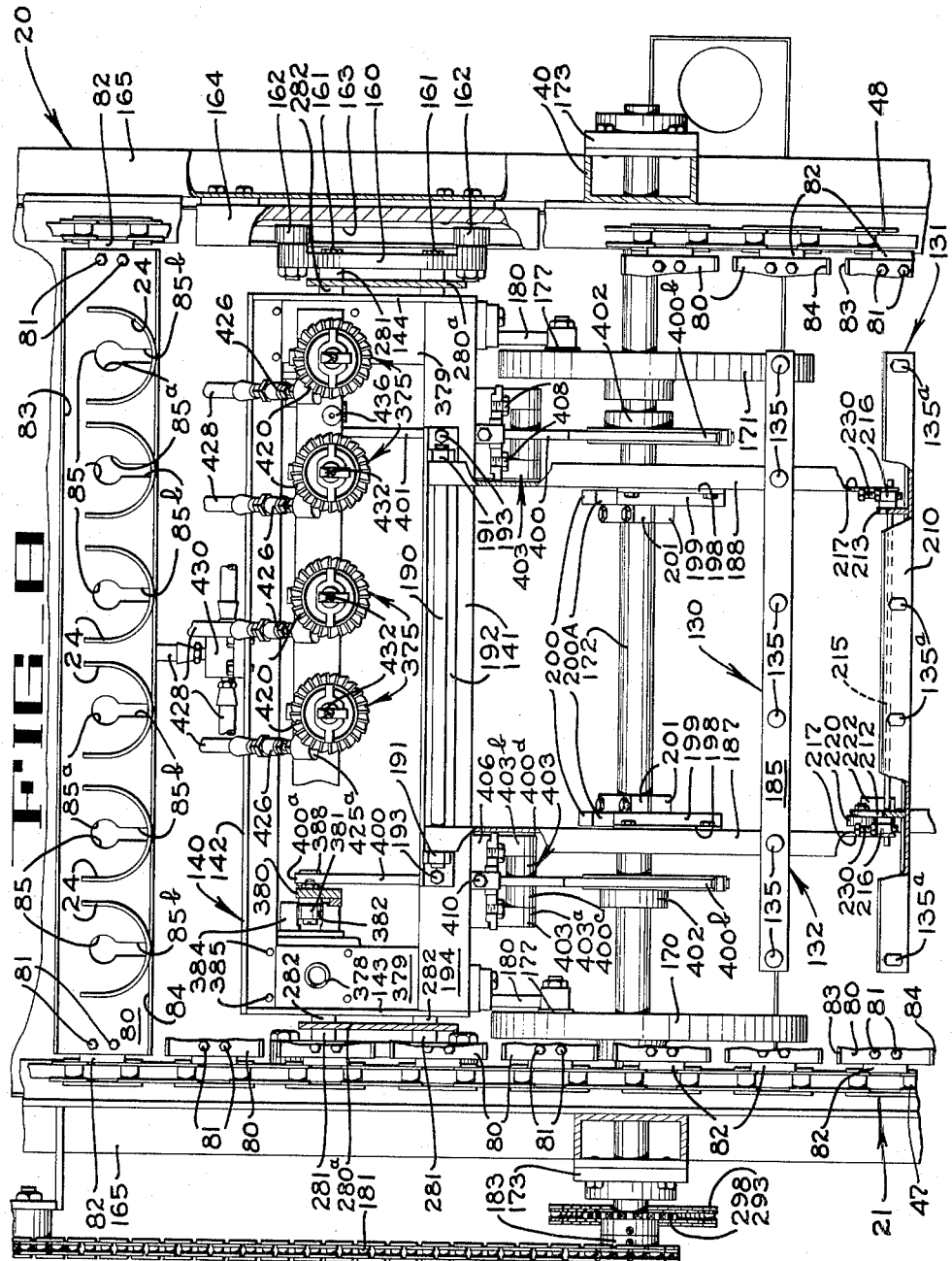

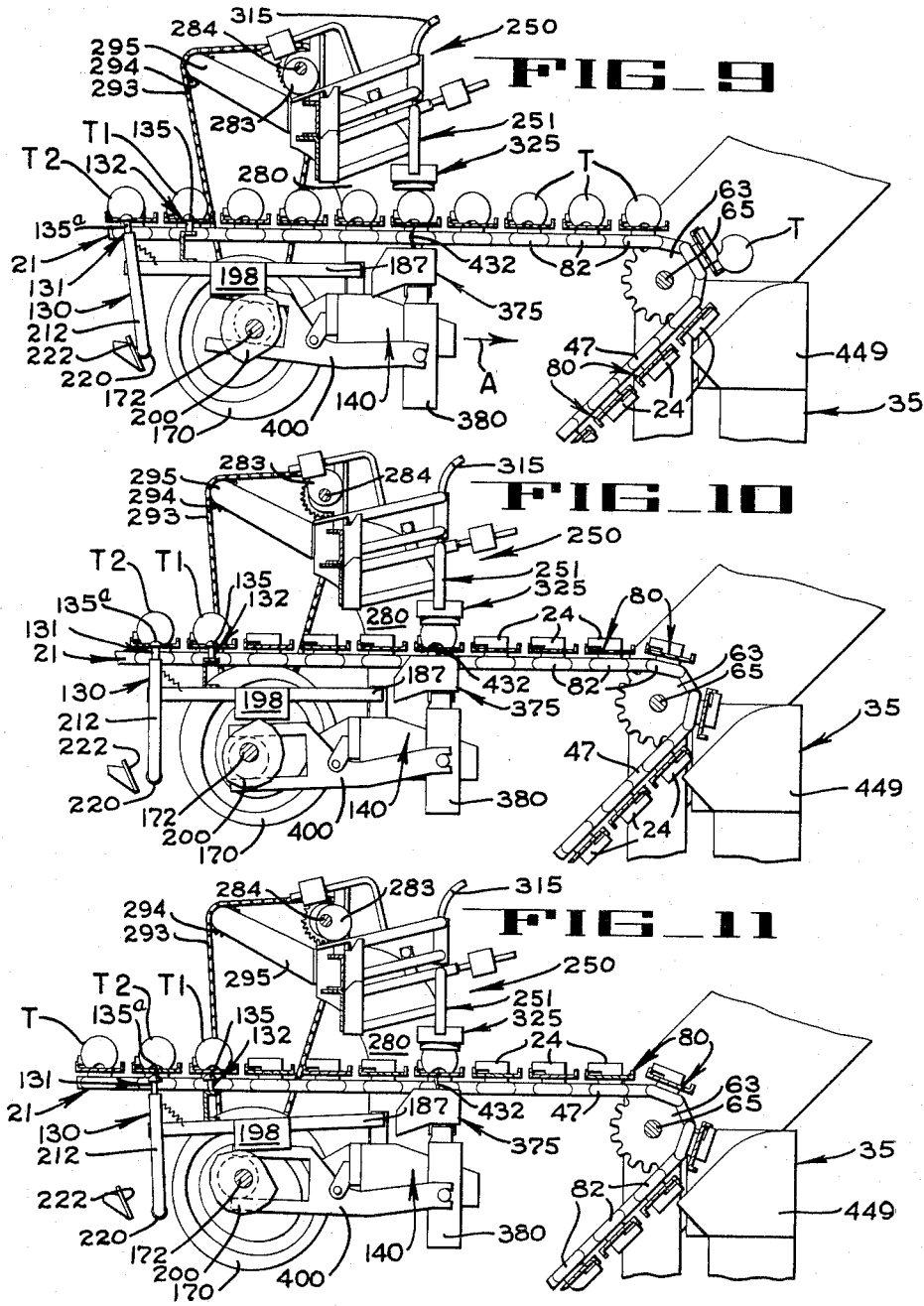

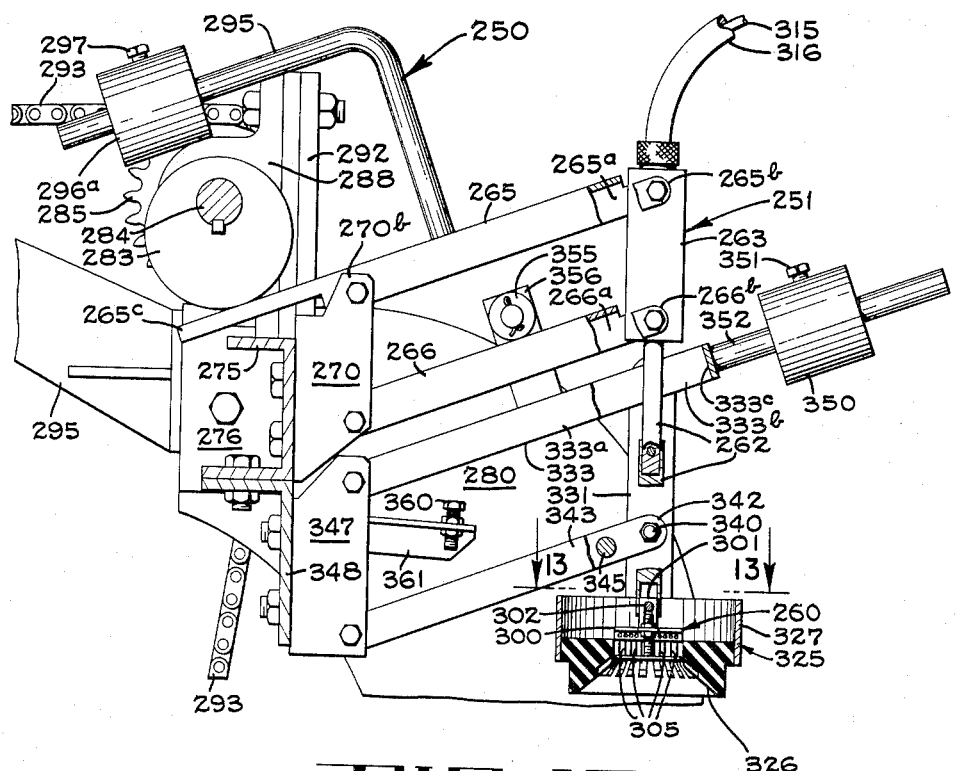
FIG_12
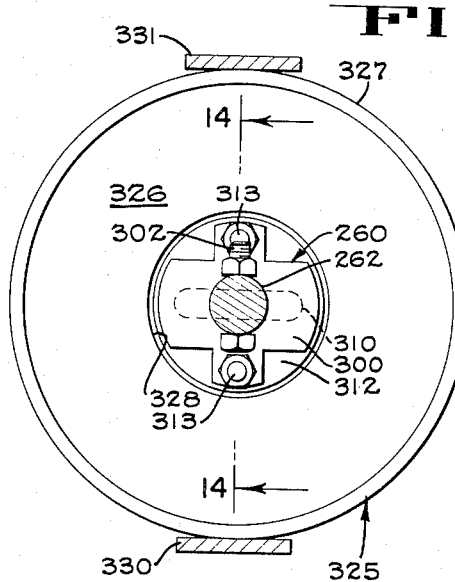
FIG_13
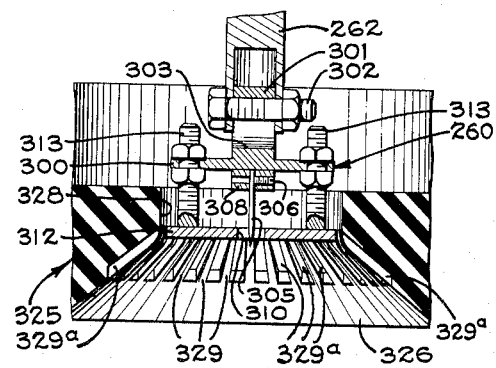
FIG_14
INVENTORS
SHERMAN H. CREED
JAMES L. REIMERS
ATTORNEY

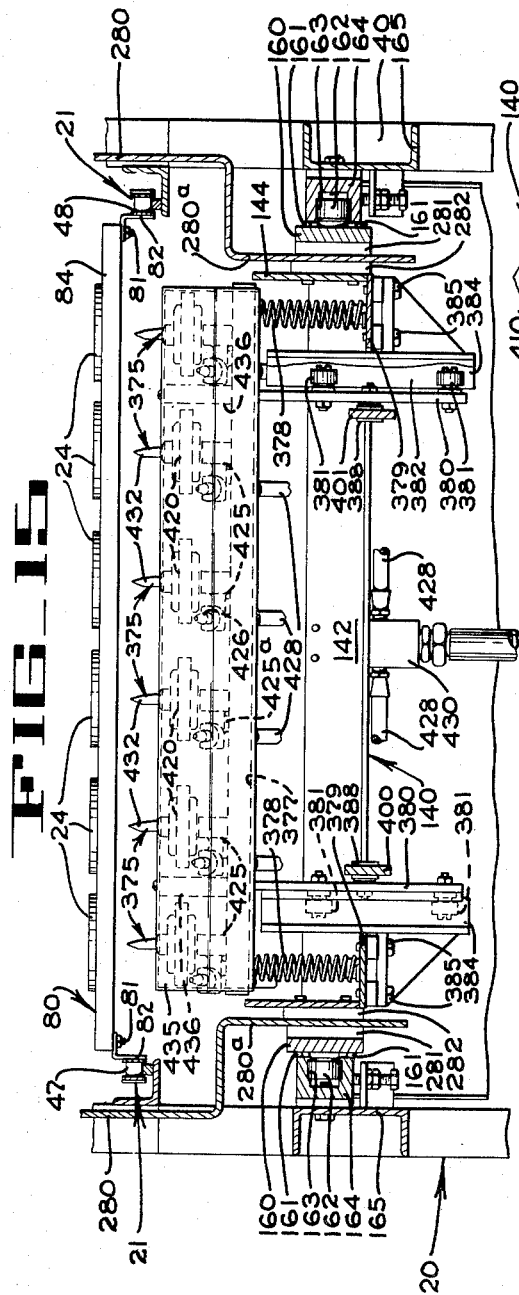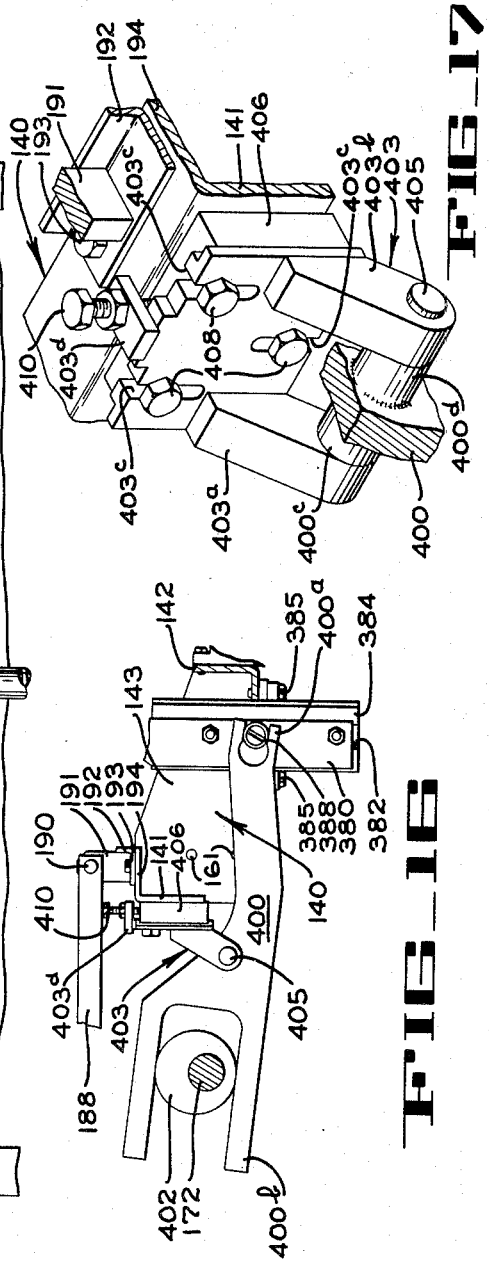

3,211,203
FRUIT TRIMMING APPARATUS
Sherman H. Creed and James L. Reimers, San Jose, Calif., assignors to FMC Corporation, a corporation of Delaware
Original application Sept. 14, 1960, Ser. No. 56,059, now Patent No. 3,096,800, dated July 9, 1963. Divided and this application Sept. 28, 1962, Ser. No. 250,197
1 Claim. (Cl. 146—81)

This invention relates to apparatus for processing fruit and more particularly relates to apparatus for centering, coring, and trimming fruit such as tomatoes.

This application is a division of our copending application, Serial No. 56,059, filed September 14, 1960, now Patent 3,096,800, July 9, 1963.

Fruit such as tomatoes have a relatively soft body surrounded by a relatively thin fragile skin and must be delicately handled to avoid damaging of the body or meat portion of the fruit. Tomatoes have a stem which projects from what is termed an "indent," which indent is a concavity or recess in the general form of a concave surface of revolution, the axis of the surface being generally aligned with the core of the fruit. Opposite the stem end of the tomato is the blossom end of the tomato and among the operations required for preparing tomatoes for subsequent processing are those of removing the core and blossom of the tomato. These operations are usually performed after the skin has been treated so as to loosen it for a subsequent peeling operation. The apparatus of the present invention is of the type wherein the tomatoes are placed on a conveyor and are carried through a lye bath to loosen the skin and are then carried past a coring cutter and a blossom cutter, and after these operations are performed, the skin is removed and the tomato is ready for further processing.

An object of the invention is that of providing a blossom cutter mechanism which is axially aligned with the coring cutter and which cooperates with a centering cup disposed coaxially with the blossom cutter, both the blossom cutter and the centering cup being disposed above the conveyor and engaging the blossom end of the fruit. Thus, the centering cup maintains the centered position of the fruit on the conveyor support plate which position was previously attained by centering means at the centering station, so that when the coring cutter engages the fruit the core will be removed without waste, and simultaneously the blossom can be trimmed at the same station.

Still another object of the invention is to provide an improved rotary blossom cutter in the form of an adjustable depth control plate with a row of cutting pins projecting through the plate.

Another object of the invention is that of providing an improved and simplified eccentric roller mechanism for actuation of the cutter mechanisms.

Other features and objects of the present invention will be apparent from the following description taken in connection with the accompanying drawings in which:

FIG. 1 is a plan view of the fruit processing machine of the present invention.

FIG. 2 is a side elevation of the machine of FIG. 1.

FIG. 3 is a fragmentary perspective of a portion of the conveyor of FIG. 1.

FIG. 4 is an enlarged fragmentary plan view of a portion of the machine of FIG. 1, looking in the direction indicated by lines 4—4 in FIG. 2, with the cover of the lye tank removed.

FIG. 5 is an enlarged vertical section taken on line 5—5 of FIG. 2.

FIG. 6 is a fragmentary enlarged vertical section taken on line 6—6 of FIG. 1.

FIG. 7 is a vertical section, with parts broken away, taken on line 7—7 of FIG. 6.

FIG. 8 is a horizontal section, with parts broken away, taken along line 8—8 of FIG. 7.

FIGS. 9, 10 and 11 are schematic views showing the centering coring the trimming mechanisms used in the present machine, said views showing the mechanisms in consecutive operating positions.

FIG. 12 is an enlarged fragmentary vertical section taken on line 12—12 of FIG. 7.

FIG. 13 is an enlarged horizontal section taken on line 13—13 of FIG. 12.

FIG. 14 is a vertical section taken on line 14—14 of FIG. 13.

FIG. 15 is a vertical section taken on line 15—15 of FIG. 6.

FIG. 16 is a fragmentary side elevation of the portion of the mechanism shown in FIG. 6 with parts broken away and parts shown in section.

FIG. 17 is an enlarged fragmentary perspective of a portion of the mechanism shown in FIG. 16.

The tomato processing machine of the present invention comprises an elongated frame support structure 20 (FIGS. 1 and 2) on which is mounted an endless chain conveyor 21 having an upper run movable toward the right, as seen in FIG. 2, to carry tomatoes T, that are disposed in cups 24, through a series of processing stations. At a loading station 25, a tomato is placed in each cup with its stem end facing downwardly. As the tomato is carried to the right it passes into a tank 27 in which it is treated for a predetermined time with a solution of lye. After leaving the lye tank 27, the tomato is carried upwardly inside an inclined housing 28 in which excess lye is drained from the tomato, and the tomato is exposed to a steam atmosphere for a fixed period of time during which the lye on the skin penetrates to the desired depth to effect loosening of the skin from the flesh of the tomato body. The steam atmosphere in the housing 28 also raises the temperature of the tomato skin to a predetermined optimum peeling temperature. After leaving the housing 28, the tomato is moved through a section 32 wherein the tomato is first accurately centered, then a coring mechanism is moved upwardly into the stem end of the tomato to remove the core, and a trimming mechanism is carried downwardly to engage the blossom end of the tomato to sever the connection of the skin to the blossom end of the tomato. After these operations, the skin has been completely loosened from the flesh of the tomato body and has been separated from the stem and blossom ends of the tomato. The tomato is then discharged from the conveyor 21 and directed downwardly through a skin removing unit 35 where the skin is separated from the flesh of the tomato.

The support frame 20 is a welded structure comprising a series of spaced vertical channels 40 defining one side of the machine. Each of the channels 40 is directly opposite a similar vertical channel in a line of channels which define the opposite side of the machine. The vertical channels are bolted to floor channels 42 and are interconnected in conventional manner by suitable transverse and longitudinal braces. Bearing blocks 45 are mounted at several positions along the frame.

The chain conveyor 21 comprises two endless chains 47 and 48 each of which is trained around a sprocket 49 that is keyed to a transverse rotatable shaft 50 (FIG. 2). As it travels toward the right, the upper run of each chain is guided over a sprocket 52 keyed to a transverse rotatable shaft 53, then under two idler sprockets 55 and 56 which are keyed to two rotatable shafts 58 and 59, respectively, over an idler sprocket 60 which is keyed to a rotatable shaft 61, and around a drive sprocket 63

(FIG. 2) keyed to a drive shaft 65. A motor 66 is arranged to drive the shaft 65 through a chain and sprocket arrangement 67. The lower run of each of the conveyor chains 47 and 48 is held in substantially horizontal position by idler sprockets 68, and a typical chain tightener 69 is operatively associated with each chain.

In the present machine, each tomato is carried along in one of the cups 24. As seen in FIG. 1, six cups are mounted in a line extending transversely of the machine on a plate 80. The cups of the conveyor are also disposed one behind the other in lines extending longitudinally of the machine. Each transverse plate 80 is secured at each end by bolts 81 (FIG. 3) to a special link 82 provided on the adjacent conveyor chain 47 or 48. Each plate 80 has an upstanding leading edge 83, an upstanding trailing edge 84, and is provided with six keyhole-shaped openings 85, each of which has a circular portion 85a and a slotted portion 85b which extends to the trailing edge 84. Each cup 24 is made up of a strap-like member that has two lower edge portions 86, each of which projects through a slot 87 in the plate 80, and is bent upwardly against the underside of the plate to which it is secured as by welding. The cup, which is disposed around one of the keyhole openings 85, is open on its leading side and has a recess 86a, provided in its trailing wall portion, which cooperates with the plate 80 to define a drain port 88 through which the lye solution may escape.

The lye solution tank 27 (FIGS. 4 and 5) is a sheet metal structure which extends entirely across the support frame 20 and is suitably secured, as by welding, to longitudinal upper channels 90 and lower angle bars 91. An opening (not shown) is provided in the forward wall of the tank above the level of the lye solution, affording an entrance passage for the conveyor 21 and the cups thereon. The level of the lye solution in the tank is approximately 1½ inches above the level of the top surface of the plates 80 on which the cups are mounted. Accordingly the lower portion of each tomato is carried through the lye solution.

The lye solution is also directed downwardly from three overhead troughs 95 (FIG. 5) which extend longitudinally of the tank, as seen in FIG. 4. Each trough is secured at one end to a transverse channel member 96 by bolts 99, and is adjustably supported at its other end on a transverse channel 97. A distributor pipe 101 (FIG. 5) is mounted above each trough and has several downwardly directed pipes 102 which fill the trough with lye solution. When the trough is full, the lye solution overflows onto downwardly and laterally slanted walls 103 of the trough, and each slanted wall 103 directs the lye solution onto one of the longitudinal lines of cups passing therebelow. The distributor pipes 101 are supplied by a header 105 which receives the lye solution from a pump 106 (FIG. 1) which is driven by a motor 107 and is connected on its suction side to a sump 108 (FIG. 5) of the lye tank. Steam coils 110 are mounted in the bottom of tank to heat the lye solution. It will be understood that the coils maintain the solution at the desired temperature and that the steam given off by the solution fills the upper part of the lye tank and the upwardly inclined housing 28, which is in communication with the outlet end of the lye tank. A vent connection 109 (FIG. 2) near the upper end of the housing 28 provides an outlet for steam.

Near the outlet end of the lye tank, at a point where the conveyor chain 21 starts upwardly to lift the tomatoes out of the lye solution, a centering unit 114 (FIG. 5) is disposed above each longitudinal line of cups on the conveyor. Each centering unit 114 comprises a pair of vertical guide members 115 and 116 which are made of relatively rigid but yieldable material such as rubber or heavy canvas, and are secured in depending relation on triangular horizontal brackets 118 (FIG. 4) which are supported from a transverse bar 120 which is secured at each end to the side wall of the tank 27 by a bracket 121.

Each pair of centering members 115 and 116 define a wedge-shaped passage through which a tomato must pass as it is lifted upwardly out of the lye solution. Since the tomato is still in a somewhat buoyant condition at this time, the centering members 115 and 116 move the tomato to the rear wall of the cup, and center the tomato in the cup. Then, when each tomato passes out of contact with the yieldable centering members and is out of the lye solution, it is in centered position in the rear of the cup.

When the tomatoes enter the processing section 32 of the machine, they are engaged by a second centering mechanism 130 (FIG. 6) which includes two transverse rows 131 and 132 (FIG. 8) of upwardly projecting pins or fingers 135 and 135a, respectively. The pins of row 131 engage and move the tomatoes disposed in one transverse row of cups toward a centered position, while the pins of row 132 perform a final centering operation on the tomatoes in a transverse row of cups that was previously acted on by the pins of row 131.

The two rows of centering pins perform their centering action while they are moving rearwardly in the machine (to the right in FIG. 6) in timed relation with the cups 24. This rearward movement of the centering pins is obtained by the connection of the pins to a movable housing or mounting member 140 (FIG. 6) which comprises a forward wall 141, a rear wall 142, and side wall members 143 and 144 (FIG. 8). Each of the side wall members 143 and 144 has a mounting plate 160 secured to it by bolts 161, and each plate 160 carries two rollers 162 that ride in a horizontal groove 163 formed in a guide member 164 that is secured to the inner face of a longitudinal channel 165 of the frame of the machine. Thus the four rollers 162 guide the housing for horizontal reciprocating movement in the frame of the machine.

Longitudinal reciprocation of the housing 140 is effected through two transversely spaced face cams 170 and 171 (FIG. 7) that are keyed to a transverse shaft 172 which is rotatably journaled in bearings 173 mounted on the frame structure. Each cam has a camming groove 175 (FIG. 6) adapted to receive a follower roller 177 which is rotatably mounted on an arm 180 bolted to the forward wall 141 of the housing 140. As seen in FIG. 6, the configuration of each camming groove 175 of each cam is such that, as the shaft 172 is rotated, the housing is reciprocated forward and back in the frame of the machine. The shaft 172 is driven through a chain 181 that is trained around a sprocket 182 on the drive shaft 65 and around a sprocket 183 (FIG. 7) keyed to the shaft 172.

The pins 135 of the transverse row 132 have rounded, segmental, spherical heads and have threaded shanks (FIG. 6) adjustably mounted in a transverse channel 185 which is bolted to two spaced longitudinal angle bars 187 and 188 (FIGS. 6 and 8), each of which is pivotally mounted at its rearward end on a bar 190. The bar 190 is mounted in tabs 191 projecting upwardly from a plate 192 that is secured by bolts 193 to a rearwardly projecting flange 194 of the forward wall 141 of the housing 140. Intermediate its length, each of the angle bars 187 and 188 carries a plate 198 that has a generally horizontal flange 199 which rides along the upper surface of a split cam 200. The cam 200 has two hub portions 201 (FIG. 6) locked together around the shaft 172 by capscrews. The camming surface of the cam 200 has a portion 200A that is disposed relatively far from the shaft 172 and is provided with a plurality of relatively sharp peaks which engage the associated flange 199 and impart a vibrating action to the bar 187 or 188 as the pins move rearwardly, to the right in FIG. 6, in an elevated position. With this arrangement, the elevated pins of the row 132 are given a vibrating movement which is effective to cause tomatoes, disposed on the upper end of the pins, to assume a centered position thereon.

The pins 135a of the transverse row 131 have rounded heads that are flattened at the sides to permit the pins to move upwardly through the slots 85b of the keyhole openings in the plate 80. The pins of row 131 also have threaded shanks adjustably mounted in a transverse angle bar 210 (FIG. 6) that is welded to the upper ends of two upright bars 212 and 213 (FIG. 8). Each of the bars 212 and 213 is secured by a setscrew (not shown) to a rod 215 that is pivotally mounted near its opposite ends in bearing plates 216 welded to the vertical flange 217 of each of the pivotal angle bars 187 and 188. Thus, the vibrating action of the bars 187 and 188 also imparts a vibrating movement to the pins 135a of the transverse row 131 as they move rearwardly in an elevated position.

It will also be noted in FIG. 6 that the cam 200 has a curved camming surface 200B that has a central portion disposed relatively close to the shaft 172. This surface permits the pins to be lowered as they are moved toward the front of the machine during the reciprocating movement of the housing 140.

The upright bar 212 (FIG. 6) has a roller 220 rotatably mounted on its lower end. The roller is held against a fixed, slanted abutment plate 222 by the action of a tension spring 223 that is connected between the upper end of bar 212 and the angle bar 187. As the vibrating pin assemblies are moved rearwardly, or to the right in FIG. 6, the spring 223 pivots the arm 212 and the rod 215, to which the arm 212 is keyed, in a clockwise direction until the arm 212 abuts the end of an adjusting bolt 230 that is threaded through the upper end of the bearing plate 216 welded to bar 187. The bolt 230 is so adjusted that the pivoting movement of the bar 212 is stopped when the pins 135 of the rear row 131 are in vertical position. When the rows of pins are moved toward the front of the machine during reciprocation of the housing 140, the slanted abutment plate 222 causes the arm 212 to be pivoted counterclockwise (FIG. 6) bringing the pins 135a of row 131 to the tilted position of FIG. 6.

A cycle in the operation of the second tomato centering mechanism 130 is illustrated in FIGS. 9, 10 and 11. In FIG. 9 the housing 140 has already started its rearward movement in the direction of arrow A under the control of cams 170 and 171. The cams 200 have raised each centering pin of row 131 upwardly through the slotted portion 85b of one of the keyhole openings 85 (FIG. 3) in cup support plate 80 to engage a tomato T2 (FIG. 9) which, at this time, is disposed in the rearward part of the associated cup. The pins of row 132 have been moved upwardly to engage a tomato T1 in the row preceding the row of tomatoes T2. As the housing 140 continues its rearward movement the cams 200 vibrate the arms 187 and 188 on which the centering pins are mounted. With this arrangement each tomato automatically centers itself on a centering pin 135 and 135a. Also, as the housing 140 moves rearwardly, the bar 212 is pivoted to upright vertical position by the spring 223 to shift the tomato T2 and center it relative to the aperture 85a of the support plate 80. Therefore, when the housing 140 reaches the position of FIG. 10, the tomato T2 is centered in the cups and the tomato T1 has been further centered by the pins of row 132. When the cams 200 continue their rotation from the position of FIG. 10, the centering pins are lowered and then the housing starts its return movement toward the front of the machine as seen in FIG. 11.

After the tomatoes in a particular transverse line of cups have been centered, they are moved under a blossom end trimming mechanism 250 (FIG. 6) which comprises six individual trimming units 251, one unit being disposed in vertical alignment with each longitudinal line of tomato centering cups. Each unit 251 comprises a cutter head 260 (FIG. 12) secured to the lower end of a rod 262 that is rotatably journaled in a bearing housing 263. The bearing housing 263 is pivotally mounted between arms 265a and 265b of a lever 265 and between arms 266a and 266b of a lever 266. The levers 265 and 266 are disposed in parallel relation and are pivotally mounted at their inner ends between two spaced flanges 270a and 270b (FIG. 7) of a bracket 270 that has a flat central portion bolted to the vertical face of a channel member 275 which is mounted transversely of the machine and has a flange 276 welded to each end. The flange 276 at each end of the channel is bolted to the upper end of a mounting plate 280 which has an inwardly offset lower end portion 280a that is supported by the bolts 161 that hold the bracket 160 on the housing 140. Spacer members 281 and 282 are disposed between the housing 140 and the mounting plate portion 280a, and between the portion 280a and the bracket 160. Since the two vertical mounting plates 280 are mounted on the housing 140, it will be evident that the plates and the blossom end trimming units 251 will move back and forth with the reciprocating housing 140.

The upper lever 265 (FIG. 6) has an extension 265c that is in contact with an eccentric roller 283 that is keyed to a shaft 284. The shaft 284, which extends transversely of the machine, has a sprocket 285 keyed to one end and is rotatably journaled in bearings 288 (FIG. 7), 289, 290 and 291, each of which is bolted to a bar 292 that is welded to and projects upwardly from the transverse channel 275. The shaft 284 is driven from shaft 172 by means of a chain 293 (FIG. 6) that is trained around sprocket 285, around a sprocket 294 rotatably mounted on a stationary bracket 295 welded to an end plate 276 and around a sprocket 298 (FIG. 7) on drive shaft 172. As the shaft 284 is rotated and the eccentrics 283 are moved toward the position shown in FIG. 12, the levers 265 and 266 are pivoted counterclockwise causing the cutter heads 260 to be simultaneously raised upward away from the tomatoes in the cups. A rod 296 is welded to the lever 265 and projects upwardly therefrom. A balance weight 296a is adjustably secured to the rod 296 by a setscrew 297.

Each cutter head 260 comprises a plate 300 (FIGS. 13 and 14) that has a central, upwardly projecting hub 301 adjustably secured to the lower end of the rotatable rod 262 by a bolt 302 which extends through a slot 303 in the hub 301. A plurality of downwardly projecting prongs or pins 305 (FIG. 12) are adjustably secured by setscrews 306 (FIG. 14) in a bar 308 that is welded to the undersurface of the plate 300. The pins 305 project downwardly through a slot 310 in a gauge plate 312 which is adjustably supported from plate 300 by studs 313 welded to the upper surface of gauge plate 312. In operation, the gauge plate 312 comes to rest on the upper surface of the tomato while the pins 305, which project a predetermined distance below the plate, cut into the blossom end of the tomato to sever all connections of the tomato skin with the blossom end of the tomato. The rod 262 is secured in a conventional manner to a flexible drive shaft 315 (FIG. 12) which is carried in a flexible casing 316 and is connected to the output shaft of a transmission 317 (FIG. 6) driven from motor 66.

Each trimming unit 251 is also provided with a tomato hold-down ring 325 (FIG. 12) that comprises a rubber annulus 326 secured, as by capscrews (not shown), to a metal ring 327. The rubber annulus 326 has a central opening 328 adapted to receive the cutter 260, and has ribs 329 formed between slots 329a on its generally frustoconical tomato-contacting and centering surface. Two upwardly projecting straps 330 and 331 (FIGS. 6 and 13) are welded at their lower ends to opposite sides of the ring 327. Each strap is pivotally connected at its upper end to one arm 333a or 333b (FIG. 12) of a U-shaped lever 333. Intermediate its length, each of the straps 330 and 331 is pivotally connected by a bolt 340 to one of two levers 342 and 343 which are held in spaced, laterally aligned relation by a pin 345 that is secured to each lever. The U-shaped lever 333 is pivotally mounted at its inner ends on a bracket 347 that is welded to a transverse angle member 348 bolted to the transverse channel 275. The levers 342 and 343 are also pivotally mounted on the bracket 347 in parallel relation to the U-shaped lever 333. A weight 350 is adjustably secured by a setscrew 351 on an arm 352 projecting outwardly from the right portion 333c of the U-shaped member 333. A roller 355 is mounted on an arm 356 which is welded to and projects upwardly from the arm 333b. This roller 355 overlies a portion of the lever 266 of the cutter linkage so that when the cutter linkage is raised by the associated eccentric roller 283, the lever 266 will engage the roller 355 and raise the hold-down ring 325. A capscrew 360, that is adjustably mounted on a fixed bracket 361, is positioned to be engaged by one of the arms of the lever 333 to limit the downward movement of the lever.

During each rotation of the eccentric rollers 283, the hold-down rings 325 and the cutters 260 move downwardly toward tomatoes in cups being moved rearwardly on the conveyer 21. The rubber annulus of each hold-down ring 325 comes to rest on a tomato with the weight 350 urging the ribs 329 into gripping engagement with the surface of the tomato. The rotating pins 305 of each cutter head 260 pass downwardly through the central opening of the associated rubber annulus and cut into the top of the tomato. The penetration of the pins is stopped when the gauge plate 312 comes to rest on the top of the tomato. It is to be noted that, while the hold-down ring moves downwardly with the cutter, the cutter is free to continue its downward movement after the hold-down ring engages the tomato. Accordingly, the pins move down into the tomato under a pressure that is the result of the weight of the cutter and the attached linkages and drive mechanism, and this pressure is counteracted by the action of the balance weight 296a. Since the weight 296a is adjustable, the pressure under which the pins move down into the tomato can be accurately controlled.

While the blossom end cutter unit engages the blossom end of the tomato, a coring unit 375 (FIG. 6) is moved upwardly to penetrate and core the tomato. A plurality of these coring units 375, which will now be explained with reference to FIGS. 6 and 15, are mounted on an inverted channel 377 which extends transversely of the machine. Adjacent each end of the channel 377 a compression spring 378 is disposed in supporting relation between the channel 377 and a bottom wall 379 of housing 140. A vertical slide plate 380, which is disposed adjacent each spring 378, projects up into the inverted channel 377 and is welded to the inner surfaces of the channel. A pair of rollers 381 (FIG. 15), which are rotatably mounted on each slide plate, are disposed in a vertical guide slot 382 in a bracket 384 that is secured by bolts 385 to the bottom wall portion 379 of the housing 140. A third roller 388 is rotatably mounted on each slide plate 380 on the opposite side of the plate from the side on which the rollers 381 are mounted. Since the bracket 384 is movable longitudinally of the machine with the reciprocating housing 140, the coring units 375 are also moved back and forth with the housing 140, the centering pins 135 and the bottom end trimming units 251.

The coring units 375 are reciprocated in a vertical direction by means of a pair of identical actuating levers 400 and 401 (FIGS. 15 and 16) which are disposed longitudinally of the machine at transversely spaced positions. Since the levers are identical and have identical mountings, a description of lever 400 (FIG. 16) and its mounting will serve to disclose the details of both levers. The lever 400 has a forked end 400a which has an arm on each side of the third roller 388 carried by one of the slide plates 380. At its opposite end the lever 400 has a forked end 400b disposed around an eccentric roller 402 that is set-screwed to the shaft 172. Intermediate its length the lever 400 is pivotally mounted on a bracket 403 by means of a pivot shaft 405 that projects through hubs 400c and 400d (FIG. 17) of the lever 400 and through a pair of spaced flanges 403a and 403b of the bracket 403. The bracket 403 is adjustably mounted on a plate 406, that is welded to the forward wall 141 of the housing 140, by means of three capscrews 408 that extend through slots 403c in the bracket 403 and are threaded in the plate 406. A flange 403d is formed on the upper end of bracket 403 and is arranged to overlie the top surface of plate 406 so that a capscrew 410 threaded through the flange 403d, engages the top surface of the plate. By adjusting the capscrews 408 and 410, the position of the pivot shaft 405 may be varied. Referring to FIG. 6, it will be evident that, when the shaft 172 is rotated, the coring units 375 are raised and lowered, as also are the previously-mentioned blossom end trimming units 251 and the centering pins 135.

Each coring unit 375 includes a vaned rotor 420 (FIG. 6) which is rotatably mounted on a shaft 422 that is secured in fixed, upright position on the transverse channel 377 by a capscrew 423. A mounting block 425 has a hub which receives the shaft 422, and a setscrew (not shown) adjustably secures the shaft 422 to the block. The mounting block 425 also has an apertured support arm 425a (FIG. 15) in which a nozzle 426 is secured. A conduit 428 is connected between each nozzle 426 and a supply header 430 which is arranged to direct fluid under pressure to the nozzles. Each nozzle 426 directs fluid upwardly against the vanes of the rotor 420 to rotate the rotor and a curved coring knife 432 that is mounted on the upper end of the rotor. The several coring units 375 are enclosed in a splash cover 435 (FIG. 6) that is supported by two spaced posts 436 (FIG. 15) which are fastened between the transverse channel 377 and the undersurface of the upper wall of the splash cover. Fluid leaving the vanes of the rotor is directed downwardly by the splash cover.

It will be understood that, during operation, the hold-down ring 325 engages the blossom end of the tomato first to hold it in fixed, non-rotating position. The blossom end cutter head 260 and the coring knife 432 then engage the tomato, approximately at the same time, to trim the blossom end and core the tomato.

After being trimmed and cored the tomatoes in each transverse line of cups are carried around the discharge end of the conveyer 21 where each tomato is dumped into a sheet metal chute 449 which directs the tomato into one of three skin-removing units 35.

The units 35 are described and claimed in the copending application of Paul C. Bean, Serial No. 695,727, filed November 12, 1957, which is assigned to the assignee of the present application and which issued on March 13, 1962, as Patent No. 3,024,821. In general, each unit comprises a tubular member having a roughened interior surface and means for guiding the tomato along a tortuous path through the tubular member, whereby the weakened and loosened skin of the tomato is ruptured and removed from the body of the tomato.

To put the machine in operation, the pump motor 107 (FIG. 2) is energized to begin the circulation of the lye solution in tank 27, and the motor 66 is energized to rotate the cutter head of each blossom end trim unit 251 and drive the shafts 65 and 172. Rotation of shaft 65 causes movement of conveyer 21, and rotation of shaft 172 causes reciprocation of the housing 140, the raising, lowering and vibrating of the centering pins 135 and 135a, the raising and lowering of the blossom end trimming units 251, and the raising and lowering of the coring units 375.

At the feed station 25, the operator places a tomato stem end down in each cup 24. As the tomato is carried through the lye tank 27, its lower portion passes through the lye solution while lye is directed downwardly onto the tomato from the overhead troughs 95. Just as the tomato is raised upwardly out of the lye solution, it moves into the wedge-shaped passage provided by the two slanted centering members 115 and 116. These centering members move the tomato to a centered position at the rear end of the cup 24. As the conveyor moves upwardly through the housing 28, the heated vapor in the housing maintains the lye coating on the tomato at a temperature such that the lye will weaken the skin and loosen from the flesh under the skin. Excess lye drains out of the cup through the drain port 88 and is directed back to the tank.

When the tomato enters the processing zone 32 it is first engaged by a pin 135a of row 131. This pin is moved upwardly through the slot 85b of the keyhole opening 85 and into the stem indent of the tomato. As the pin is pivotally moved to the upright position of FIG. 10, the tomato is vibrated and moved to a centered position in the cup. The pin 135a is then lowered and moved back toward the front of the machine to a position under a tomato in the row of tomatoes next behind. When the centering pins are again elevated, and pins 135 of row 132 move up into the previously centered tomato and the tomato is once more agitated and centered.

As the tomato is moved farther along the machine, it comes into a position between a blossom end trimming unit 251 and a coring unit 375, which are moving in a circuitous path due to the reciprocation of the housing 140, the rotation of eccentrics 283 and 402. The hold-down ring 326 of the unit 251 engages and centers the tomato in the cup and prevents rotation of the tomato while the cutter head 260 cuts into the blossom end of the tomato and the coring knife 432 cores the tomato. After the tomato has been cored and trimmed, it is carried to the end of the conveyor 21 where it is directed downwardly through the skin removing unit 35.

From the foregoing description it will be noted that the present invention provides a machine capable of efficiently centering, trimming, coring, and peeling tomatoes. The provision of centering, trimming and coring mechanism that are arranged to move along in timed relation with the tomato and operate on the tomato while it is moving makes possible the smooth and accurate handling of tomatoes.

It will be understood that modifications and variations of the invention disclosed herein may be made without departing from the scope of the present invention.

Having thus described the invention, what is claimed as new and is desired to be protected by Letters Patent is:

In a fruit processing machine, means for supporting the fruit, a cutter head comprising a support, a gauge plate secured to said support and spaced from an end portion thereof, said gauge plate being generally parallel to said fruit supporting means, means defining an elongated slot in said guage plate, a plurality of cutting pins secured to the end portion of said support in transversely aligned formation and projecting through said slot, means for vertically moving said support to bring said gauge plate and pins into and out of engagement with a fruit on said fruit supporting means, and means for continuously rotating said support during said engagement to cause the projecting portions of said pins to rotate and cut away a circular portion of the fruit.

References Cited by the Examiner
UNITED STATES PATENTS

| 1,448,532 | 3/23 | Harding | 146—47 |
| 1,923,712 | 8/33 | Deitz | 146—52 XR |
| 2,822,843 | 2/58 | Morici | 146—52 |

J. SPENCER OVERHOLSER, *Primary Examiner.*